No. 649,909. Patented May 22, 1900.
B. VON BÜLTZINGSLÖWEN.
ATTACHMENT FOR BICYCLES.
(Application filed Aug. 14, 1896.)
(No Model.) 3 Sheets—Sheet 2.
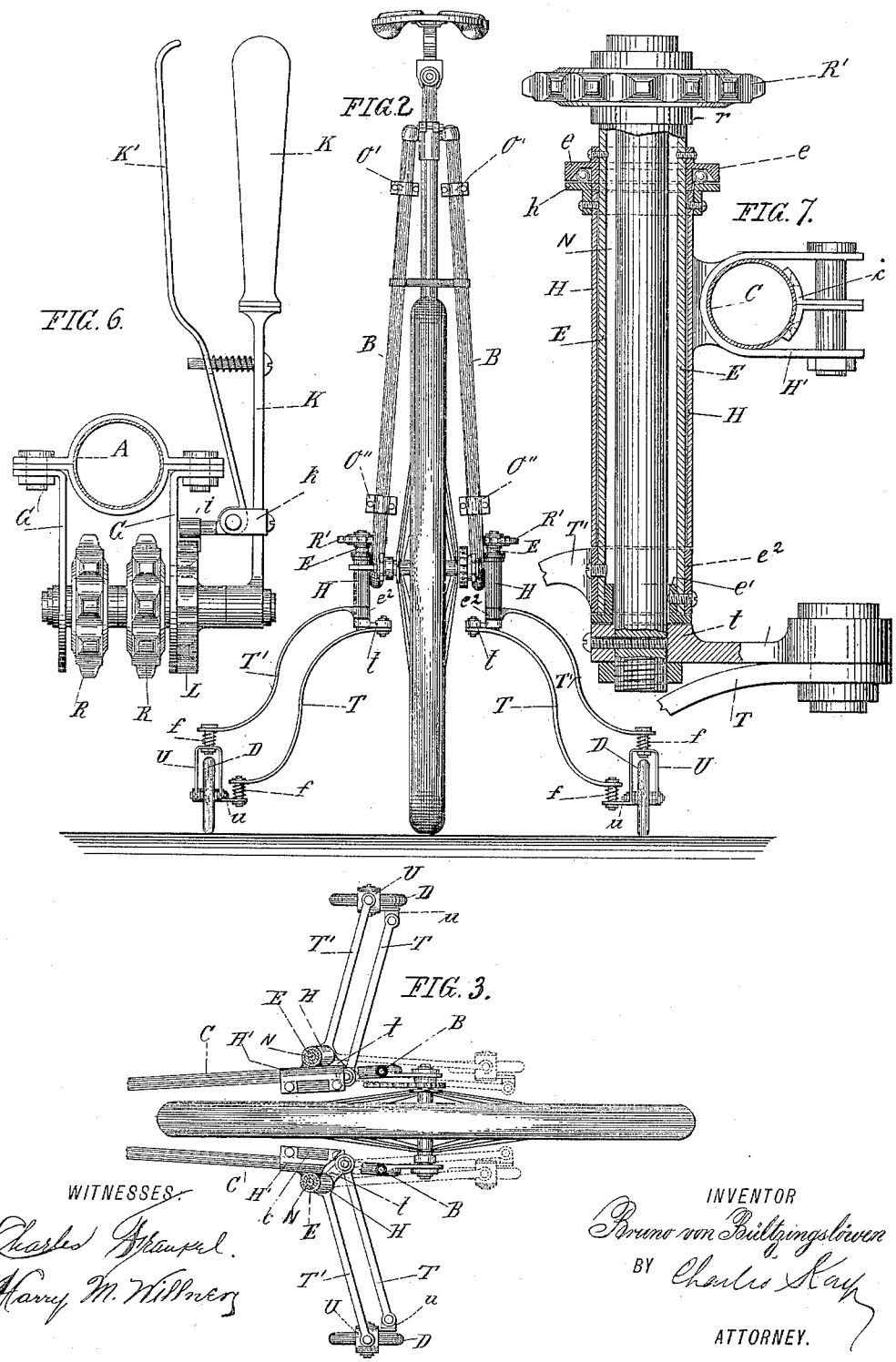
WITNESSES:
Charles Sprenkel.
Harry M. Willner
INVENTOR
Bruno von Bültzingslöwen
BY Charles Kay
ATTORNEY.

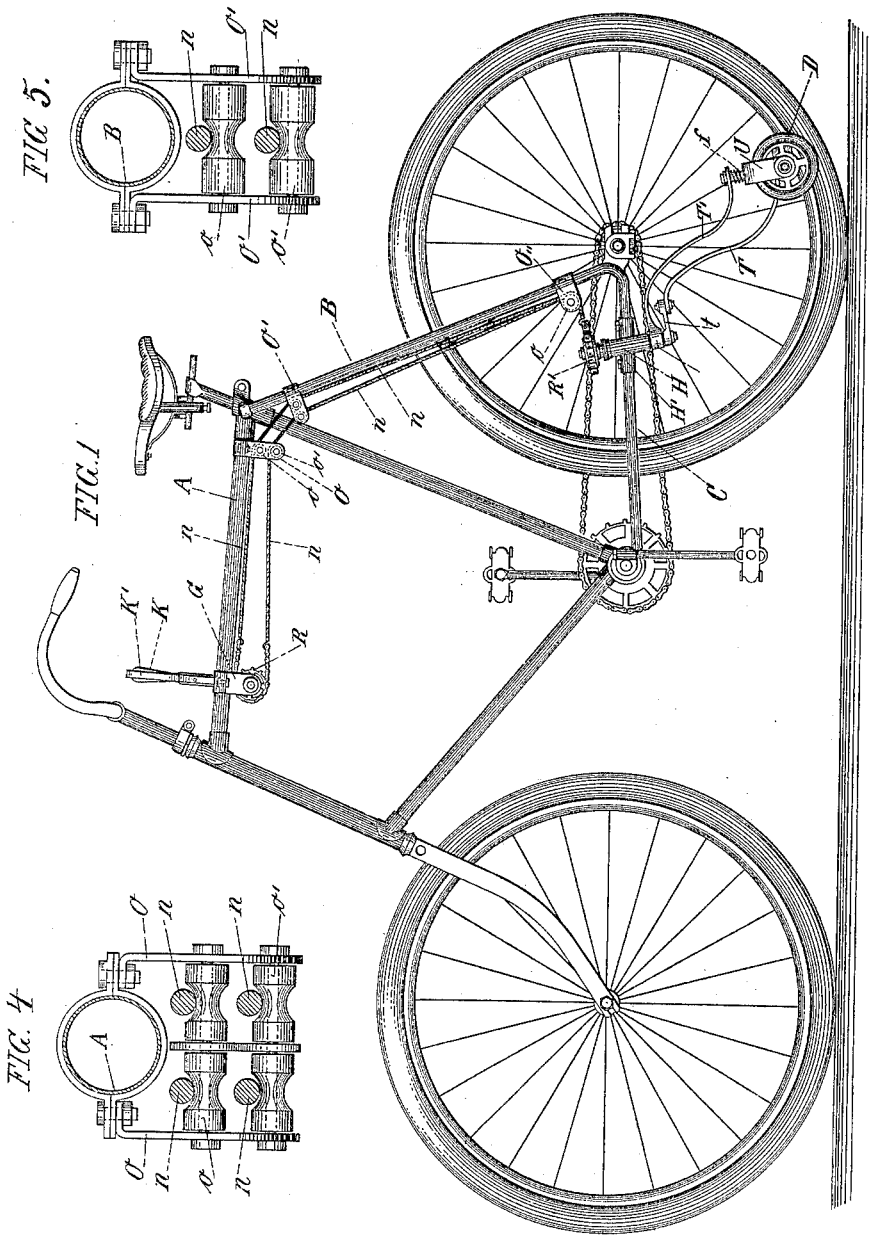

No. 649,909. Patented May 22, 1900.
B. VON BÜLTZINGSLÖWEN.
ATTACHMENT FOR BICYCLES.
(Application filed Aug. 14, 1896.)
(No Model.) 3 Sheets—Sheet 3.
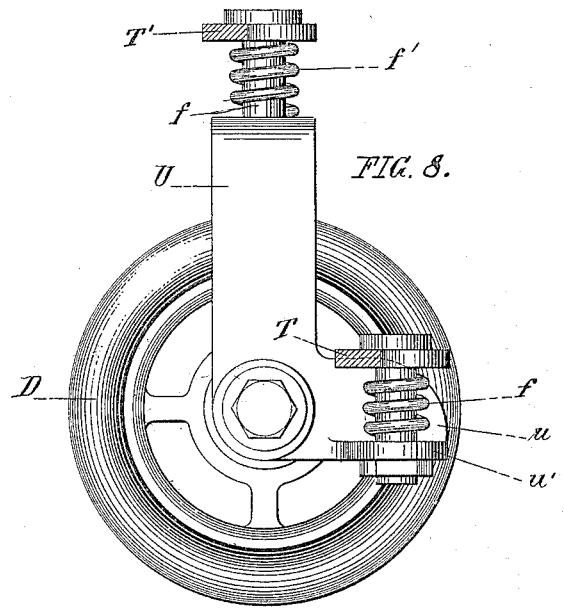
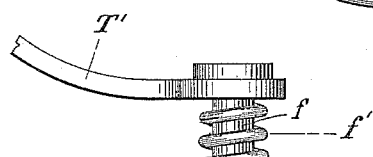
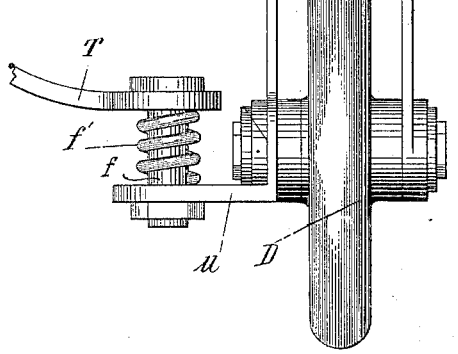
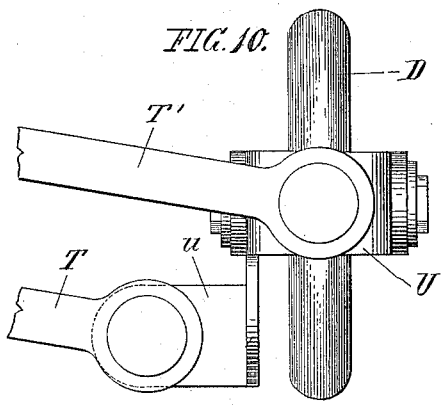
WITNESSES:
INVENTOR
Bruno von Bültzingslöwen
BY Charles Kay
ATTORNEY

UNITED STATES PATENT OFFICE.

BRUNO VON BÜLTZINGSLÖWEN, OF NEW YORK, N. Y., ASSIGNOR OF ONE-HALF TO CHRISTIAN F. DILG, OF SAME PLACE.

ATTACHMENT FOR BICYCLES.

SPECIFICATION forming part of Letters Patent No. 649,909, dated May 22, 1900.

Application filed August 14, 1896. Serial No. 602,756. (No model.)

*To all whom it may concern:*

Be it known that I, BRUNO VON BÜLTZINGS-LÖWEN, a citizen of Germany, and a resident of New York, in the county of New York and State of New York, have invented certain new and useful Improvements in Attachments for Bicycles, of which the following is a specification.

My invention has reference to attachments for bicycles constructed and arranged to serve as stands or supports for the wheels and to afford to the riders more safety, as by such attachments any lateral tilting of the bicycles is prevented.

My invention consists in the special construction illustrated in the accompanying drawings, in which—

Figure 1 is a side view of a bicycle provided with my attachment. Fig. 2 is a rear view, and Fig. 3 a top view, of the rear portion of the same. Figs. 4 to 10 are details showing different parts of the attachment on enlarged scale.

Similar letters of reference indicate corresponding parts.

A in the drawings is the top rod or tube, and B B are the rear rods or tubes of the forked rear portion of the bicycle-frame, while C C are the lower rods or tubes of the same, the rods B B holding the rear wheel and the rods C C the sprocket-wheel for the drive-chain and the treadle-bearing. To the rods C, which have a nearly-horizontal position, tubes H are fastened by means of brackets H', Fig. 7. These brackets are fork-shaped, and the prongs project beyond the rods C, which have lateral extensions $c$, through which and the prongs of the said brackets screw-bolts pass, as shown in Fig. 7, which hold the tubes H firmly on the rods C. Each rod C carries one tube H, which has an inclined position, as shown in Figs. 1 and 3. Each tube H incloses an inner tube E, through which a bolt N passes, which carries on its top a sprocket-wheel R' and on its lower end a bracket $t$. The inner tube is held in position between the said sprocket-wheel and the bracket $t$ by means of a sleeve $r$, attached to the sprocket-wheel and inclosing the tube E, and a flange $e'$, attached to the said tube by screws or otherwise and resting on the said bracket. The tube E has a ball-bearing $e$, carried by a flange $h$ of the outer tube H, so that both the tube E as well as the bolt N can rotate within the tube H. To each flange $e'$ of the tubes E an outwardly-swinging arm T' is attached by means of a sleeve $e^2$, fastened to the said flange, so that when rotated within the tube E the said arm is swung sidewise, and to each bracket $t$ of the bolts N another outwardly-swinging arm T is pivoted. Both arms are downwardly bent, the arm T being located below the arm T', as clearly shown in Figs. 1 and 2. Each arm T' carries on a stud $f$ a fork U, which holds in a bearing a small wheel D, and each fork has a lateral extension $u$, projecting toward the rear wheel and carrying another stud $f$, that is fastened to the lower arm T, as clearly shown in Figs. 9 and 10. The fork oscillates on the upper stud $f$, and the extension $u$ is pivoted to the lower stud $f$.

G is a fork-shaped bracket attached to the top rod A, through the prongs of which bracket a shaft passes, which carries a handle K outside the bracket and two fixed sprocket-wheels R R within the bracket, so that by swinging the said handle the sprocket-wheels are rotated. Outside to one prong of the bracket G a fixed ratchet-wheel L is attached, and a spring-actuated lever K' is fulcrumed in a bracket $k$ of the handle K, which lever has a pawl $i$, that meshes with the teeth of the ratchet-wheel L, as shown in Fig. 6.

O is a bracket, also attached to the top rod A, which carries four rollers, two rollers $o$ located over two rollers $o'$, and O' O' are two brackets, each rear rod B bearing one bracket, as illustrated in Fig. 2. Each bracket O' has an upper roller $o$ and a lower roller $o'$. The brackets O'' O'', Fig. 2, also attached to the rear rods, have the same construction as the brackets O' O'. Over each sprocket-wheel R, Fig. 6, is placed a drive-chain $n$, as shown in Fig. 1, which runs first over one roller $o$ in the bracket O, then over the rollers $o$ of the corresponding brackets O' and O'', then over the corresponding sprocket-wheel R' on the bolt N in the tube H, and finally back over the lower rollers $o'$ of the said brackets to the sprocket-wheel R.

A bicycle having my attachment can be ridden with the additional wheels D in operation or without using the same, as desired. When used without the said wheels, the attachment is in the position shown in Fig. 1. When the rider wants to use the wheels to prevent the tilting of the bicycle, the lever K' is pressed sidewise, whereby the ratchet-wheel L is released from the pawl $i$ and the handle K moved toward the rider, so that the drive-chains on the sprocket-wheels R R, attached to the shaft of the said handle, are so moved as to rotate the sprocket-wheels R' of the bolts N and to swing the arms T, attached to the said bolts, as described before, to the outside and place them into the position shown in Fig. 3. As the arms T, by means of the extensions $u$ and the forks U, carrying the additional wheels D, are in connection with the arms T', both arms are thus simultaneously swung out in the same direction. The inclined position of the tubes H, in which the tubes E, bearing the arms T', and the bolts N, bearing the arms T, rotate, causes the wheels D when the said arms are swung out to move down and rest on the ground. As soon as they have the required position the lever K' is released and the ratchet-wheel L again engaged by the pawl $i$, so that the handle K and the sprocket-wheels R R, with their drive-chains, and consequently the additional wheels D, are kept in a fixed position. The arms T and T' are so bent that in moving them toward or from the rear wheel of the bicycle the wheels D are always held parallel to the said rear wheel. To overcome the unevenness of the road, the studs $f$ between the lower ends of the arms T and T' and the forks carrying the wheels D are inclosed by spiral springs $f'$, which neutralize the shocks exerted on the said wheels.

When it is desired to put the wheels D out of function, the ratchet-wheel is released from the pawl, as said before, and the handle swung back. The sprocket-wheels and the drive-chains are thereby moved in a direction contrary to that described before and the wheels consequently swung back into the position shown in Fig. 1.

It will be observed that the supplementary wheels D, while being swung upward and inward and also outward and downward, are held at all times in a position practically parallel with the wheel and that the said supplementary wheels may be locked in either position at will.

Having thus described my invention, I claim as new and desire to secure by Letters Patent—

1. The combination of the forked rear portion of a bicycle-frame with tubular brackets attached in an inclined position to the same, an upper and a lower swinging arm attached to each tubular bracket, a forked frame journaled in each upper arm and pivoted to each lower arm, a wheel journaled in each forked frame, and means by which the arms of each bracket can be simultaneously swung outward or into a position parallel to the rear wheel of the bicycle.

2. In a bicycle attachment, two tubular brackets attached to the forked rear portion of the bicycle-frame, each bracket inclosing a rotary bolt N, bracket $t$ and an inner tube E, the latter carrying a fixed arm and the bolt carrying an arm pivoted to the bracket $t$ of the bolt, both arms diverging in the same direction and the arm of the bolt being located beneath the arm of the tube E, and a forked frame journaled in the free end of each upper arm and pivoted to the free end of each lower arm, each forked frame carrying a rotary wheel, in combination with means to rotate simultaneously the bolts N and the inner tubes E in the tubular brackets.

3. In a bicycle attachment, two tubular brackets attached to the forked rear portion of the bicycle-frame, each bracket inclosing a rotary bolt N, bracket $t$ and an inner tube E, the latter carrying a fixed arm and the bolt carrying an arm pivoted to the bracket $t$ of the bolt, both arms diverging in the same direction and the arm of the bolt being located beneath the arm of the tube E, a sprocket-wheel attached to each bolt N and tube E, a forked frame journaled in the free end of each upper arm and pivoted to the free end of each lower arm, each forked frame carrying a rotary wheel, and drive-chains running over the said sprocket-wheels and held by suitable means on the bicycle-frame to impart to the bolts N and the tubes E simultaneous rotary motion.

4. In a bicycle attachment, two tubular brackets attached to the forked rear portion of the bicycle-frame, each bracket inclosing a rotary bolt N, bracket $t$ and an inner tube E, the latter carrying a fixed arm and the bolt carrying an arm pivoted to the bracket $t$ of the bolt, both arms diverging in the same direction and the arm of the bolt being located beneath the arm of the tube E, a sprocket-wheel R' attached to each bolt N and tube E, a forked frame journaled in the free end of each upper arm and pivoted to the free end of each lower arm, each forked frame carrying a rotary wheel, sprocket-wheels R journaled in a bracket attached to the top portion of the bicycle-frame and having their shaft provided with a handle to rotate the same, and drive-chains running over the said sprocket-wheels R and R'.

5. In a bicycle attachment, two tubular brackets attached to the forked rear portion of the bicycle-frame, each bracket inclosing a rotary bolt N, bracket $t$ and an inner tube E, the latter carrying a fixed arm and the bolt carrying an arm pivoted to the bracket $t$ of the bolt, both arms diverging in the same direction and the arm of the bolt being located beneath the arm of the tube E, a sprocket-wheel R' attached to each bolt N and tube E, a forked frame journaled in the free end of each upper arm and pivoted to the free end of each lower arm, each forked frame carrying a rotary wheel, sprocket-wheels R journaled in a bracket attached to the top portion of the bicycle-frame and having their shaft provided with a handle to rotate the same, a ratchet-wheel firmly attached to the shaft of the sprocket-wheels R, a pawl attached to the said handle and engaging the teeth of the ratchet-wheel, and drive-chains running over the sprocket-wheels R and R' to impart to the bolts N and tubes E simultaneous rotary motion.

6. In combination, a bicycle, a holder for a supplementary wheel consisting of two pivoted levers or arms, manual operating means therefor, whereby said supplementary wheel may be swung inward and upward and also outward and downward at will, and also means to hold said supplementary wheel in a position practically parallel with the bicycle in both locations.

7. In combination, a bicycle, a holder for a supplementary wheel consisting of two pivoted levers or arms, manual operating means therefor, whereby said supplementary wheel may be swung inward and upward and also outward and downward at will, and means whereby said supplementary wheel may be locked in either position.

8. In combination, a bicycle, a holder for a supplementary wheel consisting of two pivoted levers or arms, manual operating means therefor consisting of a handle, and a belt or chain intermediate the handle and wheel, whereby said supplementary wheel may be swung inward and upward and also outward and downward at will, and also means to hold said supplementary wheel in a position practically parallel with the bicycle in both locations.

9. In combination, a bicycle, a holder for a supplementary wheel consisting of two pivoted levers or arms, manual operating means therefor consisting of a handle, and a belt or chain intermediate the lever and wheel, whereby said supplementary wheel may be swung inward and upward and also outward and downward at will, and also means to hold said supplementary wheel in a position practically parallel with the bicycle in both locations, and means whereby said supplementary wheel may be locked in either position.

10. In combination, a bicycle, a holder for a supplementary wheel consisting of two pivoted levers or arms, manual operating means therefor, whereby said supplementary wheel may be swung inward and upward and also outward and downward at will.

Signed at New York, in the county and State of New York, this 15th day of June, A. D. 1896.

BRUNO VON BÜLTZINGSLÖWEN.

Witnesses:
CH. F. DILG,
CHAS. H. J. DILG.